United States Patent
Wang et al.

(10) Patent No.: US 11,726,682 B2
(45) Date of Patent: Aug. 15, 2023

(54) APPLICATION LEVEL SD CARD SPACE MANAGEMENT

(71) Applicant: Ambarella International LP, Santa Clara, CA (US)

(72) Inventors: XianDong Wang, Shanghai (CN); DianRong Du, Shanghai (CN); ZhiFeng Niu, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 40 days.

(21) Appl. No.: 17/126,248

(22) Filed: Dec. 18, 2020

(65) Prior Publication Data

US 2022/0179569 A1 Jun. 9, 2022

(30) Foreign Application Priority Data

Dec. 7, 2020 (CN) .......................... 202011430021.9

(51) Int. Cl.
*G06F 16/18* (2019.01)
*G06F 3/06* (2006.01)

(52) U.S. Cl.
CPC .......... *G06F 3/0631* (2013.01); *G06F 3/0604* (2013.01); *G06F 3/0619* (2013.01); *G06F 3/0665* (2013.01); *G06F 3/0679* (2013.01); *G06F 16/1847* (2019.01)

(58) Field of Classification Search
CPC ... G06F 16/1847; G06F 3/0631; G06F 3/0604
See application file for complete search history.

(56) References Cited

U.S. PATENT DOCUMENTS

| | | | | |
|---|---|---|---|---|
| 8,271,996 B1* | 9/2012 | Gould | ..................... | G06F 9/542 |
| | | | | 719/330 |
| 10,110,814 B1* | 10/2018 | Day | ....................... | H04N 23/698 |
| 10,156,993 B1* | 12/2018 | Armangau | ............ | G06F 3/0608 |
| 10,165,182 B1* | 12/2018 | Chen | ..................... | H04N 5/2252 |
| 10,205,984 B1* | 2/2019 | Cho | .................. | H04N 21/23406 |
| 10,783,412 B1* | 9/2020 | Truong | .............. | G06K 15/1825 |
| 10,853,311 B1* | 12/2020 | Hayes | ..................... | G06F 16/11 |
| 10,853,320 B1* | 12/2020 | Bono | ..................... | G06F 16/137 |
| 11,048,591 B1* | 6/2021 | Mamidi | .............. | G06F 16/2246 |
| 2007/0186041 A1* | 8/2007 | Swasdee | .............. | G06F 13/385 |
| | | | | 711/170 |
| 2008/0155175 A1* | 6/2008 | Sinclair | .............. | G06F 12/0646 |
| | | | | 711/E12.078 |
| 2013/0166580 A1* | 6/2013 | Maharajh | .............. | G06Q 50/01 |
| | | | | 707/758 |
| 2014/0317336 A1* | 10/2014 | Fitch | ................... | G06F 12/1036 |
| | | | | 711/103 |
| 2016/0127260 A1* | 5/2016 | Gordon | ................ | H04N 21/234 |
| | | | | 709/231 |
| 2016/0212496 A1* | 7/2016 | Lau | ...................... | H04N 21/631 |

* cited by examiner

*Primary Examiner* — Vaishali Shah
(74) *Attorney, Agent, or Firm* — Christopher P. Maiorana, PC

(57) ABSTRACT

An apparatus includes a removable media interface circuit and a processor. The removable media interface may be configured to read and write files to a non-volatile storage medium. The processor may be configured to generate encoded data and manage file operations involving storing the encoded data on the non-volatile storage medium to minimize a number of file fragments.

20 Claims, 11 Drawing Sheets

APPLICATION LEVEL SD CARD SPACE MANAGEMENT

This application relates to Chinese Application No. 202011430021.9, filed Dec. 7, 2020, which is incorporated by reference in its entirety.

FIELD OF THE INVENTION

The invention relates to storage interfaces generally and, more particularly, to a method and/or apparatus for implementing application level secure digital media (SD) card space management.

BACKGROUND

When a digital video recorder (DVR) product is encoding multiple streams, the streams are saved to a secure digital media (SD) card at same time. When saving multiple streams simultaneously to an SD card, the SD card can become very fragmented. A large amount of fragmentation on the SD card will slow down the writing speed. When the writing speed is reduced sufficiently, the DVR product is unable to write the video data to the SD card fast enough, resulting in loss of the video data. DVR products write and delete files on the SD card very frequently. The frequent writing and deleting of files leads to a large amount of fragmentation of the SD card, which finally results in low writing speed. Then data loss happens.

It would be desirable to implement an application level secure digital media (SD) card space management that reduces fragmentation.

SUMMARY

The invention encompasses an aspect concerning an apparatus comprising a removable media interface circuit and a processor. The removable media interface may be configured to read and write files to a non-volatile storage medium. The processor may be configured to generate encoded data and manage file operations involving storing the encoded data on the non-volatile storage medium to minimize a number of file fragments.

In some embodiments of the apparatus aspect described above, the non-volatile storage medium may be formatted using either a virtual file allocation table (vFAT) file system or and extended file allocation table (exFAT) file system.

In some embodiments of the apparatus aspect described above, the non-volatile storage medium may comprise a secure digital media (SD) card.

In some embodiments of the apparatus aspect described above, the processor generally implements an application level space management scheme to create, remove, overwrite, and resize files in order to avoid fragmentation of the files. In some embodiments where the processor implements an application level space management scheme, the application level space management scheme provides user space application program interfaces to allocate and free space in the non-volatile storage medium using file block units.

In some embodiments of the apparatus aspect described above, the processor may be configured to encode the data as an MPEG-4 compliant file.

In some embodiments of the apparatus aspect described above, the processor may be configured to encode video data as an MPEG-4 compliant video file.

In some embodiments of the apparatus aspect described above, the removable media interface circuit and the processor may be part of a digital recorder product.

In some embodiments of the apparatus aspect described above, the removable media interface circuit and the processor may be part of a digital video recorder product.

In some embodiments of the apparatus aspect described above, the removable media interface circuit and the processor are part of a dash camera product.

In some embodiments of the apparatus aspect described above, the removable media interface circuit and the processor are part of a digital camera system on chip (SoC) product.

In some embodiments of the apparatus aspect described above, the apparatus may further comprise an image sensor configured to generate video data and communicate the video data to the processor.

The invention also encompasses an aspect concerning a method of managing a storage medium comprising generating encoded data using a processor and managing file operations involving storing the encoded data on a non-volatile storage medium using the processor to minimize a number of file fragments.

In some embodiments of the method aspect described above, the non-volatile storage medium may be formatted using either a virtual file allocation table (vFAT) file system or an extended file allocation table (exFAT) file system.

In some embodiments of the method aspect described above, the non-volatile storage medium may comprise a secure digital media (SD) card.

In some embodiments of the method aspect described above, the processor may implement an application level space management scheme to create, remove, overwrite, and resize files in order to avoid fragmentation of the files. In some embodiments where the processor implements an application level space management scheme. the application level space management scheme may provide user space application program interfaces to allocate and free space in the non-volatile storage medium using file block units.

In some embodiments of the method aspect described above, the encoded data is encoded as an MPEG-4 compliant file.

In some embodiments of the method aspect described above, the encoded data comprises video data and is encoded as an MPEG-4 compliant video file.

In some embodiments of the method aspect described above, the method further comprises generating the video data using an image sensor and communicating the video data to the processor.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
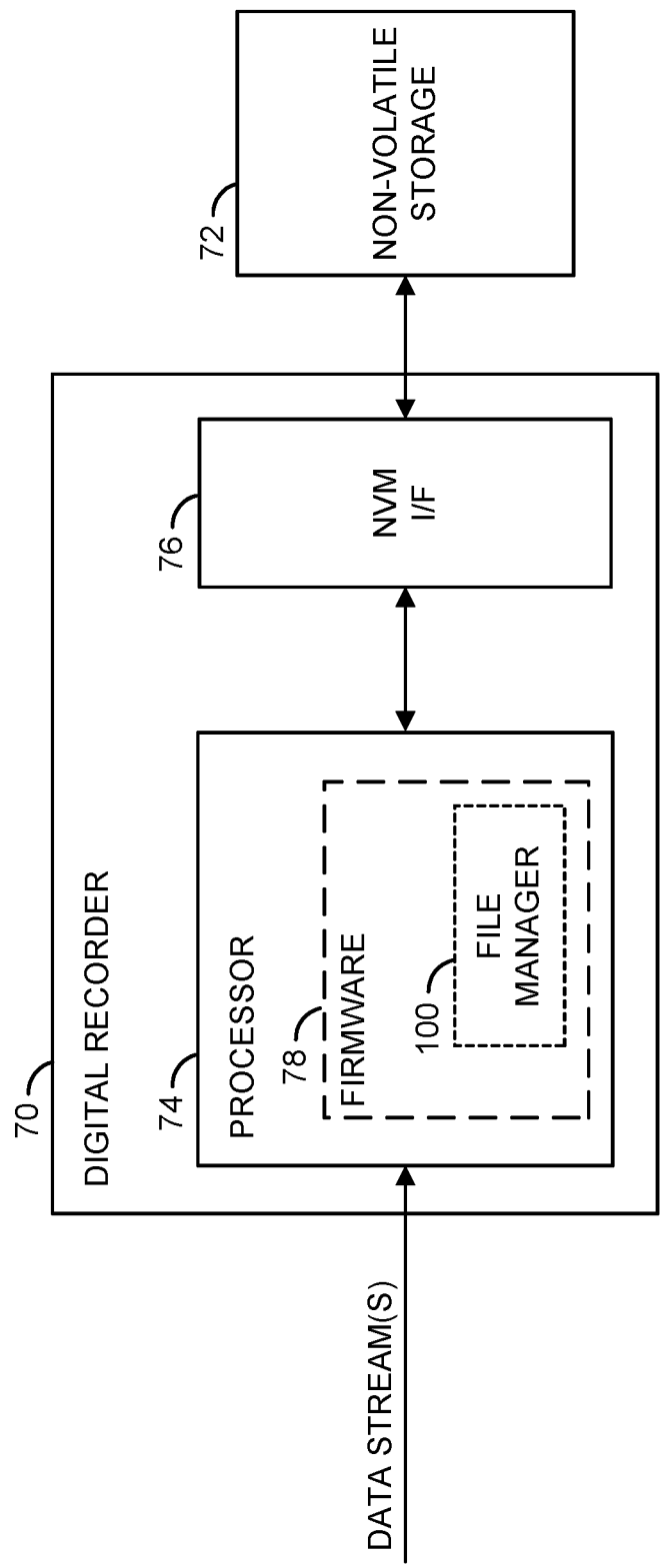
FIG. 1 is a block diagram illustrating an example implementation of file management layer in accordance with an embodiment of the invention in the context of a camera.

Embodiments of the present invention include providing application level secure digital media (SD) card space management that may (i) create file block units, (ii) provide application program interfaces (APIs) allowing a user to allocate/free space by the file block units, (iii) eliminate file fragmentation, (iv) avoid writing speed slow down, (v) provide create, delete, and write commands to an upper layer of a storage protocol, and/or (vi) be implemented as one or more integrated circuits.

In general, there are two file writing cases in digital video recorder (DVR) products. In a first case, a size of recording files remains the same over time. The first case is generally representative of normal recording. In a second case, a size of recording files is constantly changing. The second case is generally representative of manual recordings, which are controlled by an end user, or event recordings, which are triggered by an emergency. When using vFAT (virtual file allocation table) as the file system, fallocate( ) is one recommended solution for case 1. However, fallocate( ) does not work for the file writing case where the size of the recording files is constantly changing (e.g., case 2).

In various embodiments, an application level secure digital media (SD) card space management scheme may be implemented that aims to solve the problem in file writing case 2. In various embodiments, an application level secure digital media (SD) card space management scheme is provided to wrap a layer for a user to create/remove/overwrite/resize a file instead of using a vFAT file system application program interface (API) directly. The application level secure digital media (SD) card space management scheme in accordance with embodiments of the invention generally allows the user to avoid the file fragmentation that may occur using the vFAT file system application program interface (API) directly. In general, the application level secure digital media (SD) card space management scheme in accordance with embodiments of the invention works with vFAT, and may be extended to the exFAT (extended file allocation table) file system also.

In an example, the application level secure digital media (SD) card space management scheme in accordance with embodiments of the invention may be implemented in Linux. However, the application level secure digital media (SD) card space management scheme in accordance with embodiments of the invention is not limited to Linux. The application level secure digital media (SD) card space management scheme in accordance with embodiments of the invention may also be implemented for other operating systems that use vFAT/exFAT for recording data (e.g., video data, sensor data, etc.) to secure digital media (SD) cards. The application level secure digital media (SD) card space management scheme in accordance with embodiments of the invention may also be implemented for other types of media including, but not limited to, a universal serial bus (USB) storage device, a hard disk drive (HDD), etc., as long as the particular type of media is formatted as vFAT/exFAT.

Traditional file management in video recorders calls system APIs directly, resulting in very fragmented files when recording (e.g., described below in connection with FIG. 4). In various embodiments, a new file management layer (e.g., referred to herein as Amba_File_Manager) is implemented to provide newly wrapped user space APIs and manage the file system to reduce and/or avoid fragments.

Referring to FIG. 1, a block diagram illustrating an embodiment of the invention in the context of a digital recorder 70 is shown. In an example embodiment, the digital recorder 70 may be coupled to a non-volatile storage medium 72. In an example, the non-volatile storage medium 72 may be implemented as removable media. In an example, the non-volatile storage medium 72 may comprise a secure digital media (SD) card. However, other types of media may be implemented accordingly (e.g., a universal serial bus (USB) storage device, a hard disk drive (HDD), etc.). In general, the storage media 72 is formatted as vFAT/exFAT. In various embodiments, the digital recorder 70 may receive a number of streams of data (e.g., DATA STREAM(S)). The streams DATA STREAM(S) may be received from a variety of sources.

In an example, the streams may be received from one or more video sources (or cameras) and/or one or more sensors (e.g., security, vehicle, etc.). In various embodiments, the streams may comprise multiple video streams from different video sources (e.g., cameras around a structure, around a vehicle, etc.). In various embodiments, the digital recorder 70 may be implemented as part of a solid-state handheld camcorder, a sports camera, a dash camera or integrated digital video recorder in a vehicle, or other digital recorder product. In some embodiments implementing vehicle cameras, the digital recorder 70 may be configured for single and/or dual-view camera configurations, supporting video recording through the front windshield as well as through the rear window or inside the vehicle.

In some embodiments, the streams may comprise multiple video streams with different resolutions and/or formats. In some embodiments, the streams may comprise multiple sensor data streams with different resolutions and/or formats. In general, the mixture/combination of data streams is not fixed and may vary based upon criteria of a particular application or product. In various embodiments, the streams of data may be recorded simultaneously on the non-volatile storage media 72 using a file management layer in accordance with an embodiment of the invention. In general, the same file management layer in accordance with an embodiment of the invention may be applied regardless of from where the streams of data are received and what resolutions and/or formats the streams of data are comprised.

In some embodiments, the digital recorder 70 may comprise one or more circuits configured to implement a digital video recorder. In an example, the electronics of the digital recorder 70 may be implemented as one or more integrated circuits. In an example, an application specific integrated circuit (ASIC) or system-on-a-chip (SoC) may be used to implement a processing portion of the digital recorder 70. In an example embodiment, the digital recorder 70 may comprise a block (or circuit) 74 and/or a block (or circuit) 76. The circuit 74 may implement a processor circuit. The circuit 76 may implement a non-volatile memory (NVM) interface (I/F). The digital recorder 70 may comprise other components (not shown). The number, type and/or function of the components of the digital recorder 70 may be varied according to the design criteria of a particular implementation.

The processor circuit 74 may be implemented as an embedded processor (e.g., ARM, etc.). In some embodiments, the processor 74 may comprise a number of hardware blocks (or units) configured for digital recording, computer vision tasks, and controlling one or more image processing operations (e.g., noise reduction, sharpening, etc.) performed on one or more data streams. In some embodiments, the processor 74 may comprise a block (or circuit) 78. The circuit 78 may be implemented as embodying either software or firmware. The software or firmware embodied in the circuit 78 may comprise a portion (or code or routine) 100. The portion 100 may implement a file management layer in accordance with an embodiment of the invention.

Figure 2:
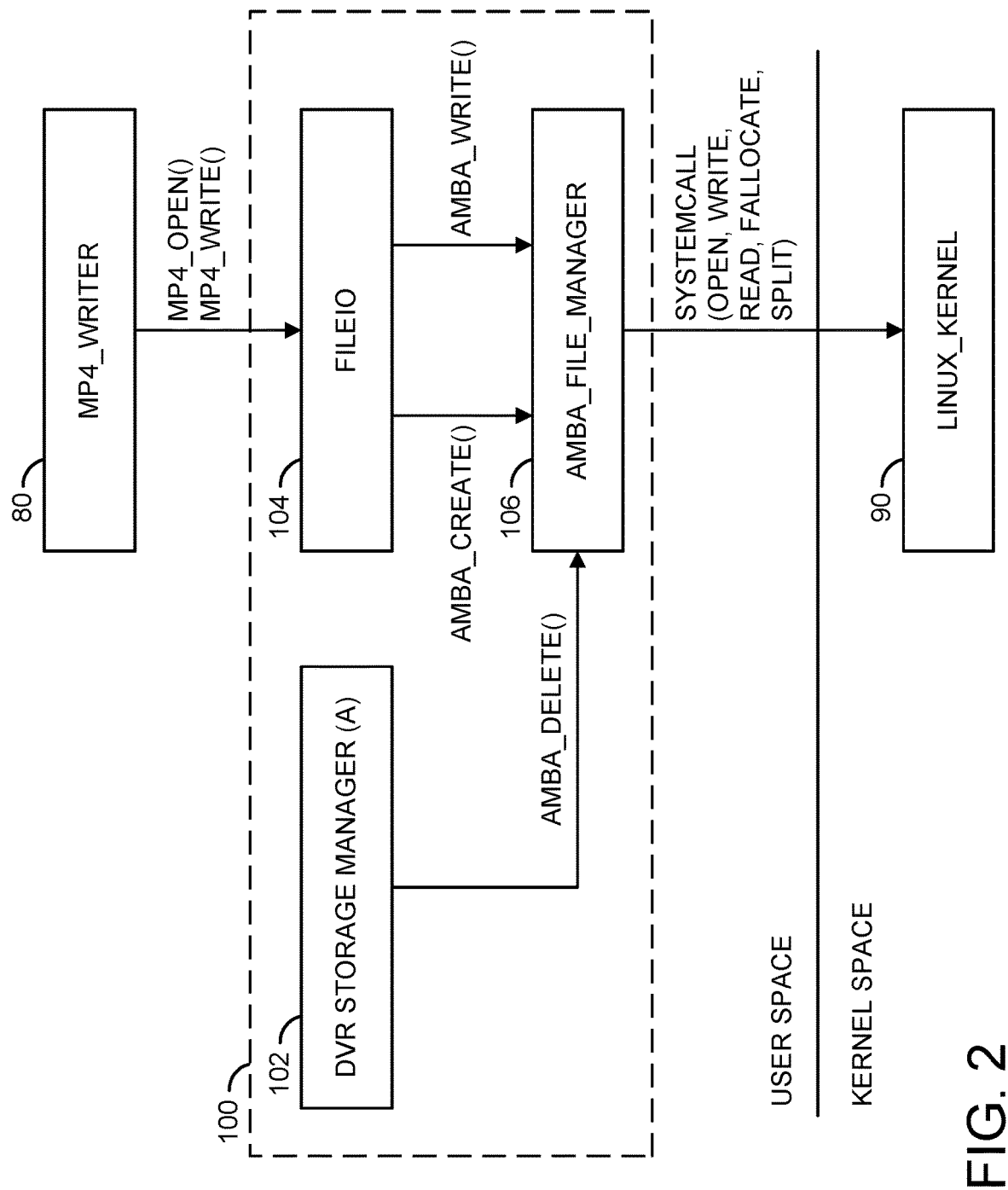
FIG. 2 is a diagram illustrating a novel file management layer in accordance with an example embodiment of the invention.

Referring to FIG. 2, a block diagram is shown illustrating a file management layer in accordance with an example embodiment of the invention. In an example, the digital recorder 70 may be configured to implement a digital video recorder (DVR) product. In an example, the DVR product may comprise an application 80, a system kernel 90, and the file management layer 100 in accordance with an embodiment of the invention. In an example, the application 80 may be implemented to write MPEG-4 compliant encoded files to a removable storage media (e.g., non-volatile storage medium 72).

In an example, the removable storage media may comprises a secure digital media (SD) card. In an example, the application 80 may be configured to perform operations such as opening, closing, reading, writing, seeking, etc. In an example, the application 80 may issue an open command (e.g., MP4_OPEN( )) to request that a file be opened. In another example, the application 80 may issue a write command (e.g., MP4_WRITE( )) to write to a file that has been opened. In various embodiments, the application 80 may communicate the commands MP4_OPEN and MP4_WRITE to the file management layer 100.

In various embodiments, the file management layer 100 may be configured to issue system calls to the system kernel 90 in response to the commands received from the application 80. In an example, the system calls may perform operations such as opening, closing, reading, writing, seeking, file allocation, file splitting, etc. In an example, the system kernel 90 may be implemented as a Linux kernel of a Linux operating system. In various embodiments, the operations of the application 80 and the file management layer 100 generally occur in a user space.

In a kernel space, the system kernel 90 transforms the communications from the file management layer 100 into operations in a physical layer of the digital video recorder product. In an example, the system kernel 90 may direct file access requests to a removable storage media such as a SD card in a peripheral device space of the digital video recorder product (not shown).

In various embodiments, the file management layer 100 may comprise a DVR storage manager 102, a file I/O manager 104, and a file manager (e.g., AMBA_FILE_MANAGER) 106 in accordance with an example embodiment of the invention. In an example, the DVR storage manager 102 may be configured to manage the storage space available to the DVR product. In various embodiments, the DVR storage manager 102 is generally responsible for issuing a user space delete command (e.g., AMBA_DELETE( )) to reclaim unit files from files that are no longer needed. The unit file size is a minimum size that is managed by the DVR storage manager 102. In various embodiments, the DVR storage manager 102 generally communicates the user space delete command to the file manager 106.

In various embodiments, the unit file size is programmable. In an example, the unit file size may be set to 16 MB, 32 MB, etc. In various embodiments, the unit file size may be set based upon a balancing of predetermined criteria. In an example, the criteria used in deciding a specific unit file size may comprise fragmentation level and space wasted per file. The final decision is generally a tradeoff between these two criteria. In various embodiments, the unit file size selection strategy may depend on particular features of the product.

In an example embodiment, a single stream may be recorded with different recording periods. In a first case where an encoding stream of bitrate 1 Mbyte/s is to be recorded to files every 15 seconds(s), the size of one recording file will be 1 Mbyte/s*15 s=15 Mbytes. If a unit file size of 8 Mbytes is chosen, then a unit file(file_record) of 8 Mbytes would be created once a recording process gets started. When a written size becomes greater than 8 Mbytes, another unit file of 8 Mbytes would be created and merged to "file_record". The recording file would end up containing one fragment and 8 Mbytes*2−15 Mbytes=1 Mbyte of storage space would be wasted. If a unit file size of 16 Mbytes is chosen, then a unit file of 16 Mbytes may be created every time a recording process gets started. No fragment would exist inside the file and, as a consequence of the unit file size, 16 Mbytes−15 Mbytes=1 Mbyte would be wasted. If a unit file size of 32 Mbytes is chosen, then a file of 32 Mbytes would be created every time a recording process is started. No fragment would exist inside the file and, as a consequence of the unit file size, 32 Mbytes−15 Mbytes=17 Mbytes would be wasted. In the above examples, the option of selecting a unit file size of 16 Mbytes appears to provide the better balance of the criteria.

In an example embodiment where two streams may be recorded with different recording periods, a first recording file (e.g., File_1) may be written by a first encoding stream of bitrate 1 Mbyte/s every 32 seconds and a second recording file (e.g., File_2) may be written by a second encoding stream of bitrate 1 Mbyte/s every 24 seconds. In this example, a size of the first recording file File_1 would be 32 s×1 Mbytes/s=32 Mbytes, while a size of the second recording file File_2 would be 24 s×1 Mbytes/s=24 Mbytes. If the unit file size of 8 Mbytes is chosen, then File_1 would contain 4 fragments and File_2 would contain 3 fragments. In both cases no space is wasted for either of the two files. If the unit file size of 16 Mbytes is chosen, then File_1 would contain 2 fragments and File_2 would contain 2 fragments also. The result for File_1 is quite good in that no space is wasted. However, for File 2, 8 Mbytes would end up being wasted (e.g., 32 Mbytes−24 Mbytes=8 Mbytes). If a unit file size of 15 Mbytes is chosen, then File_1 would contain 3 fragments to cover recording requirements and File_2 would contain 2 fragments. For File_1, the amount of wasted space would be 15 Mbytes×3−32 Mbytes=13 Mbytes. For File_2, the amount of wasted space would be 30 Mbytes−24 Mbytes=6 Mbytes. Here, it is really hard to determine which one of the unit file sizes is the best choice. For applications that are more tolerant of fragments, the first option may be determined to be the best choice, while for applications that are more tolerant of wasted space the second option may be determined to be the best choice.

In various example embodiments, the file I/O manager 104 may be configured to receive the commands (e.g., MP4_OPEN( ), MP4_WRITE( ), etc.) communicated by the application 80 to the file management layer 100. The file I/O manager 104 is generally configured to generate user space commands for creating files (e.g., AMBA_CREATE( ), and for writing to files (e.g., AMBA_WRITE( )) in response to the commands MP4_OPEN( ) and MP4_WRITE( ), respectively, received from the application 80. The file I/O manager 104 is generally configured to communicated the commands AMBA_CREATE( ) and AMBA_WRITE( ) to the file manager 106.

In various embodiments, the file manager 106 is generally configured to issue the system calls (e.g., open, write, read, fallocate, split, etc.) to the system kernel 90. The file manager 106 may be configured to generate the system calls open, write, read, fallocate, split, etc. in response to receiving one or more of the user space commands AMBA_DELETE( ), AMBA_CREATE( ), and AMBA_WRITE( ) from the DVR storage manager 102 and the file I/O manager 104, respectively.

Figure 3:
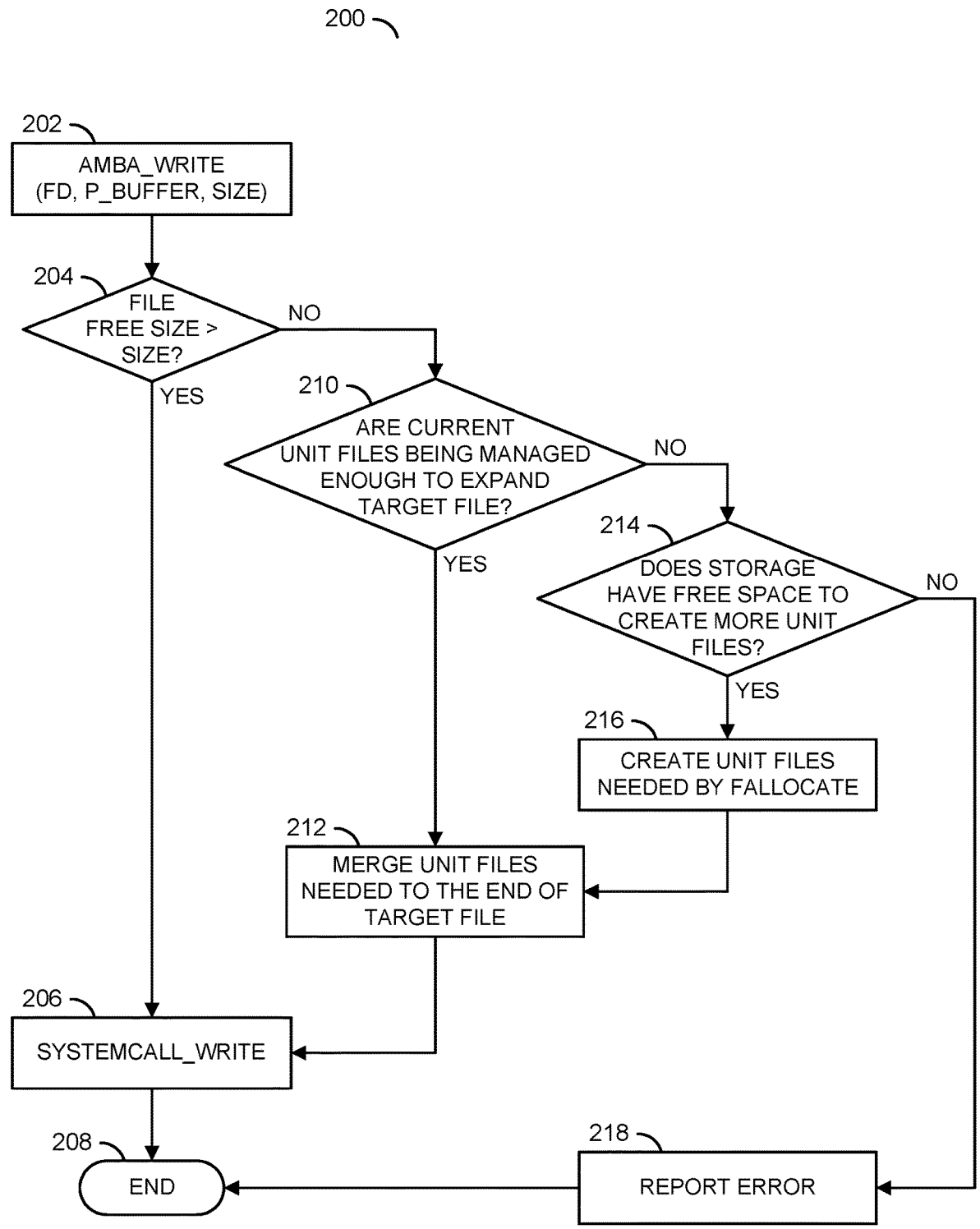
FIG. 3 is a flow diagram illustrating a user space application program interface (API) for writing a file in accordance with an example embodiment of the invention.

Referring to FIG. 3, a flow diagram is shown illustrating a process 200 implementing a user space application program interface (API) for generating a system call for writing a file in accordance with an example embodiment of the invention. In an example, the process (or method) 200 may comprise a step (or state) 202, a step (or state) 204, a step (or state) 206, a step (or state) 208, a step (or state) 210, a step (or state) 212, a step (or state) 214, a step (or state) 216, and a step (or state) 218. In the step 202, the process 200 may receive an AMBA_WRITE command and associated parameters. In an example, the parameters may include, but are not limited to, a file descriptor for an opened file (e.g., FD), a source data buffer pointer (e.g., P_BUFFER), a data size to be written to the opened file (e.g., SIZE), and/or a full file path name for the opened file FD (e.g., FULL_FILE_PATH_NAME).

In the step 204, the process may determine whether a file free size is greater than the size specified by the parameter SIZE of the AMBA_WRITE command. When the file free size is greater than the value specified by the parameter SIZE, the process 200 may move to the step 206 to generate a system call to write the data identified by the parameters FD and P_BUFFER of the AMBA_WRITE command. The process 200 may then move to the step 208 and terminate.

When the file free size is not greater than the value specified by the parameter SIZE, the process 200 may move to the step 210. In the step 210, the process 200 may determine whether current unit files being managed by the DVR storage manager 102 are enough to expand a target file. When the current unit files being managed by the DVR storage manager 102 are enough to expand (or extend) the target file, the process 200 may move to the step 212. When the current unit files being managed by the DVR storage manager 102 are not enough to expand the target file, the process 200 may move to the step 214.

In the step 212, the process 200 may merge unit files needed to expand the target file to the end of the target file. The process 200 may then move to the step 206 to generate a system call to write the data identified by the parameters FD and P_BUFFER of the AMBA_WRITE command, and then move to the step 208 to terminate. In an example, the process 200 may use a SPLIT system call to split a file and to merge the free unit(s) to the target file. In an example, a first file (e.g., A) may have 10 KB and a second file (e.g., B) may have 20 KB. If 10 Kb is to be split from file B to file A, a split command may be issued accordingly. After the split command is executed, the size of file A would be 20 KB and the size of file B would be 10 KB. Similarly, to merge the whole file B with file A, a split command may be issued specifying that 20 KB of file B is to be split to file A. After the split command is executed, the size of file A would be 30 KB and file B would no longer exist.

In the step 214, the process 200 may determine whether the storage medium has free space available to create more unit files. When the storage medium has free space to create more unit files, the process 200 may move to the step 216. Otherwise, the process 200 may move to the step 218. In the step 216, the process 200 may create a number of unit files needed by issuing a FALLOCATE( ) command, and then move to the step 212 to merge the newly created unit files needed to expand the target file to the end of the target file. The process 200 may then move to the step 206 to generate a system call to write the data identified by the parameters FD and P_BUFFER of the AMBA_WRITE command, and then move to the step 208 to terminate. In the step 218, the process 200 may report an error due to the lack of available free space. The process 200 may then move to the step 208 to terminate.

Figure 4:
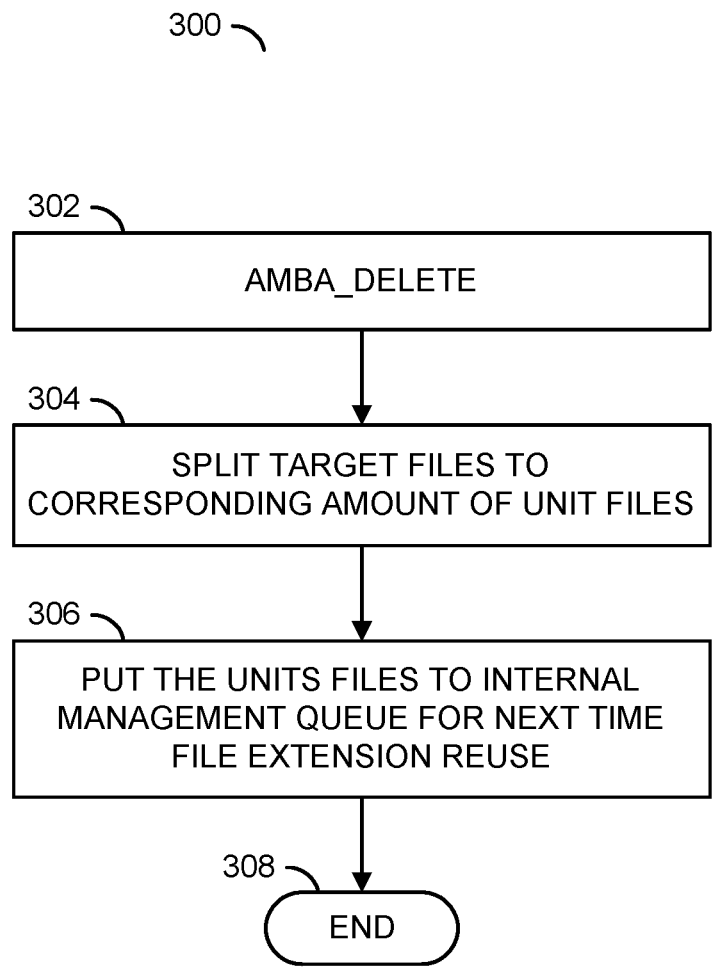
FIG. 4 is a flow diagram illustrating a user space application program interface (API) for deleting a file in accordance with an example embodiment of the invention.

Referring to FIG. 4, a flow diagram is shown illustrating a process 300 implementing a user space application program interface (API) for generating a system call for deleting a file in accordance with an example embodiment of the invention. In an example, the process (or method) 300 may comprise a step (or state) 302, a step (or state) 304, a step (or state) 306, and a step (or state) 308. In the step 302, the process 300 may receive an AMBA_DELETE( ) command and move to the step 304. In the step 304, the process 300 may split target files to a corresponding amount of unit files, then move to the step 306. In the step 306, the process 300 may put the unit files into an internal management queue of the DVR storage manager 102 for reuse the next time a file extension (or expansion) is needed. The process 300 may then move to the step 308 and terminate.

Figure 5:
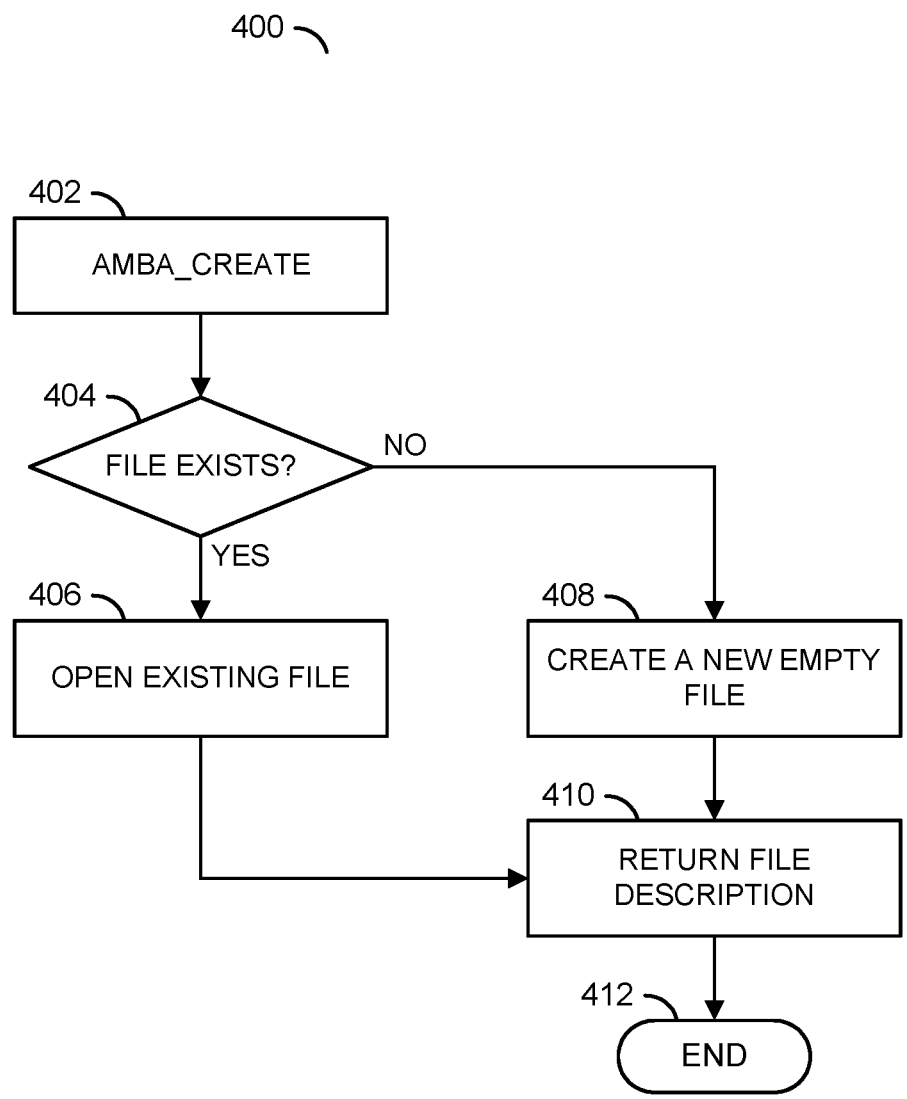
FIG. 5 is a flow diagram illustrating a user space application program interface (API) for creating a file in accordance with an example embodiment of the invention.

Referring to FIG. 5, a flow diagram is shown illustrating a process 400 implementing a user space application program interface (API) for generating a system call for creating a file in accordance with an example embodiment of the invention. In an example, the process (or method) 400 may comprise a step (or state) 402, a step (or state) 404, a step (or state) 406, a step (or state) 408, a step (or state) 410, and a step (or state) 412. In the step 402, the process 400 may receive an AMBA_CREATE command and associated parameters and return parameters associated with creating a new file. In an example, the parameters may include, but are not limited to, a file descriptor for an opened file (e.g., FD) and/or a full file path name for the opened file FD (e.g., FULL_FILE_PATH_NAME).

In the step 404, the process 400 may determine whether a file already exists. When the file already exists, the process 400 may move to the step 406 to open the existing file. When the file does not already exists, the process 400 may move to the step 408 to create a new empty file. After either the step 406 or the step 408, the process 400 may move to the step 410 to return the file description. The process 400 may then move to the step 412 to terminate.

Figure 6:
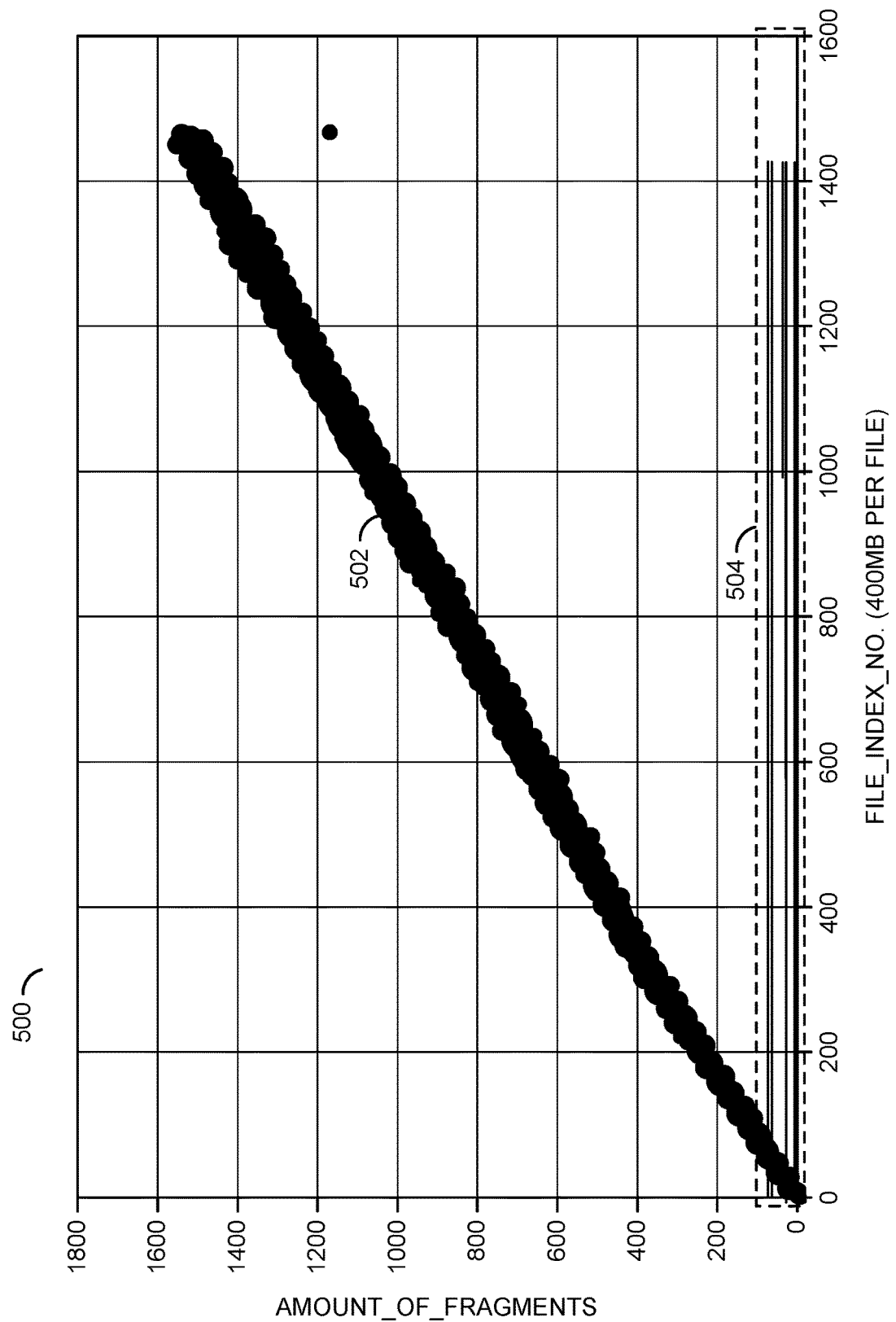
FIG. 6 is a diagram illustrating a comparison between a conventional file management layer and the file management layer in accordance with an example embodiment of the invention.

Referring to FIG. 6, a graph 500 is shown illustrating a comparison between simulations of a traditional file management layer and a file management layer in accordance with an example embodiment of the invention. In an example, similar write strategies may be applied to traditional file writes and file writes using the file management layer 100 in accordance with an example embodiment of the invention. The graph 500 generally illustrates the different file fragmentation performance between the traditional file management layer and the file management layer 100 in accordance with an example embodiment of the invention.

A curve 502 generally illustrates the fragmentation performance of the traditional file manager. When a digital video recorder (DVR) product is encoding multiple streams, the streams are saved to a secure digital media (SD) card at same time. When saving multiple streams simultaneously to an SD card, the SD card becomes increasingly fragmented. A section 504 contains a graph generally illustrating the fragmentation performance of the file management layer 100 in accordance with an example embodiment of the invention. In an example, test files with a size of 400 MB were applied to simulate both cases. A unit file size of 16 MB was set by the file management layer 100, which means the maximum number of fragments per test file would be controlled to under 26 (e.g., 400 MB/16 MB+1=26). As may be seen by simple inspection, the file management layer 100 provides a fragmentation performance that is significantly better than the fragmentation performance of the traditional file management scheme.

Figure 7:
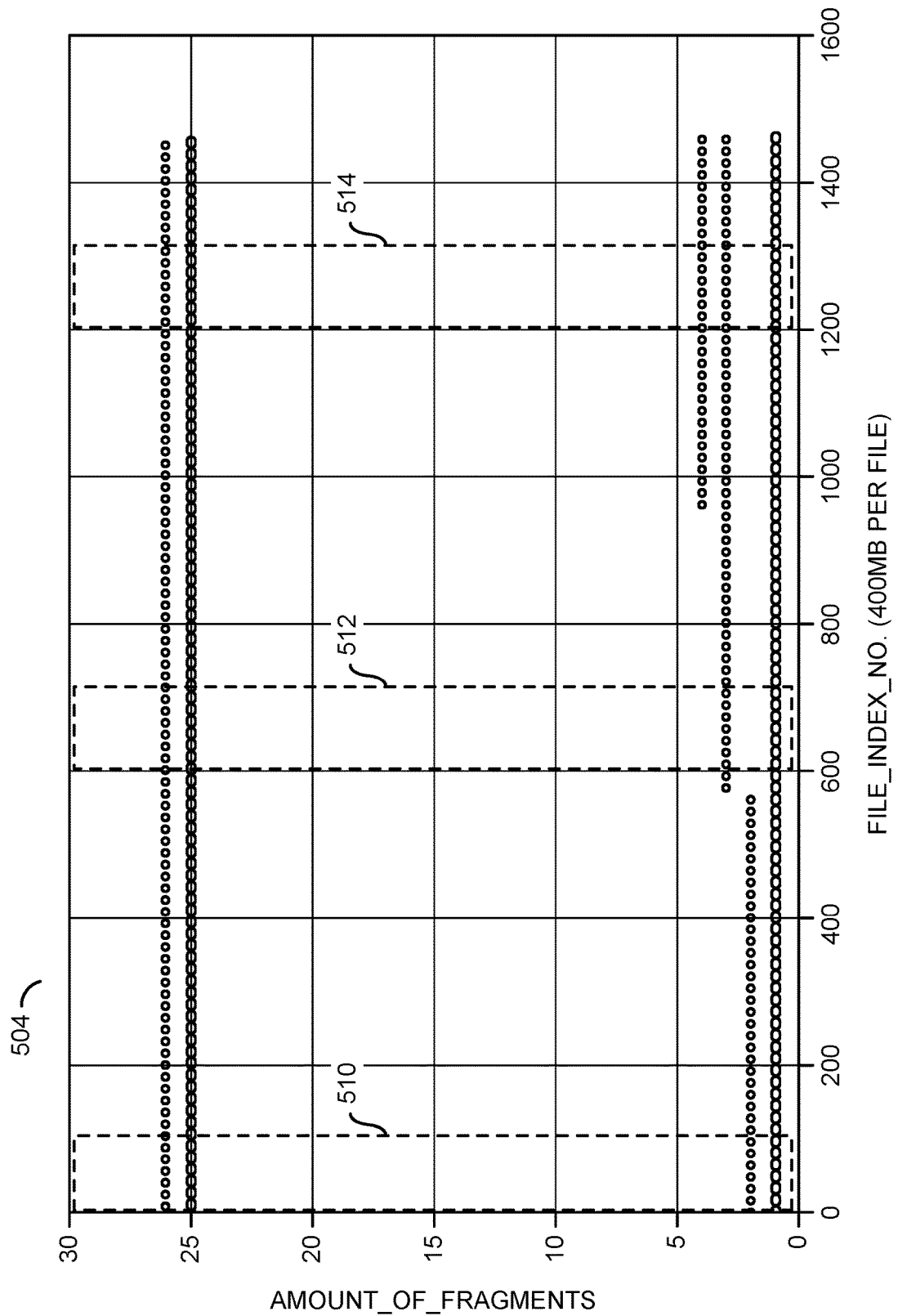
FIG. 7 is a diagram showing an enlarged view of a section 504 of FIG. 6 illustrating fragment performance using the file management layer in accordance with an example embodiment of the invention.

Referring to FIG. 7, an enlarged view of the section 504 of FIG. 6 is shown illustrating the fragmentation performance for the file management layer 100 in accordance with an example embodiment of the invention. A section 510 illustrates fragment performance for files indexed from 0 to 100 using the file management layer 100 in accordance with an example embodiment of the invention. A section 512 illustrates fragment performance for files indexed from 600 to 700 using the file management layer 100 in accordance with an example embodiment of the invention. A section 514 illustrates fragment performance for files indexed from 1200 to 1300 using the file management layer 100 in accordance with an example embodiment of the invention.

Figure 8:
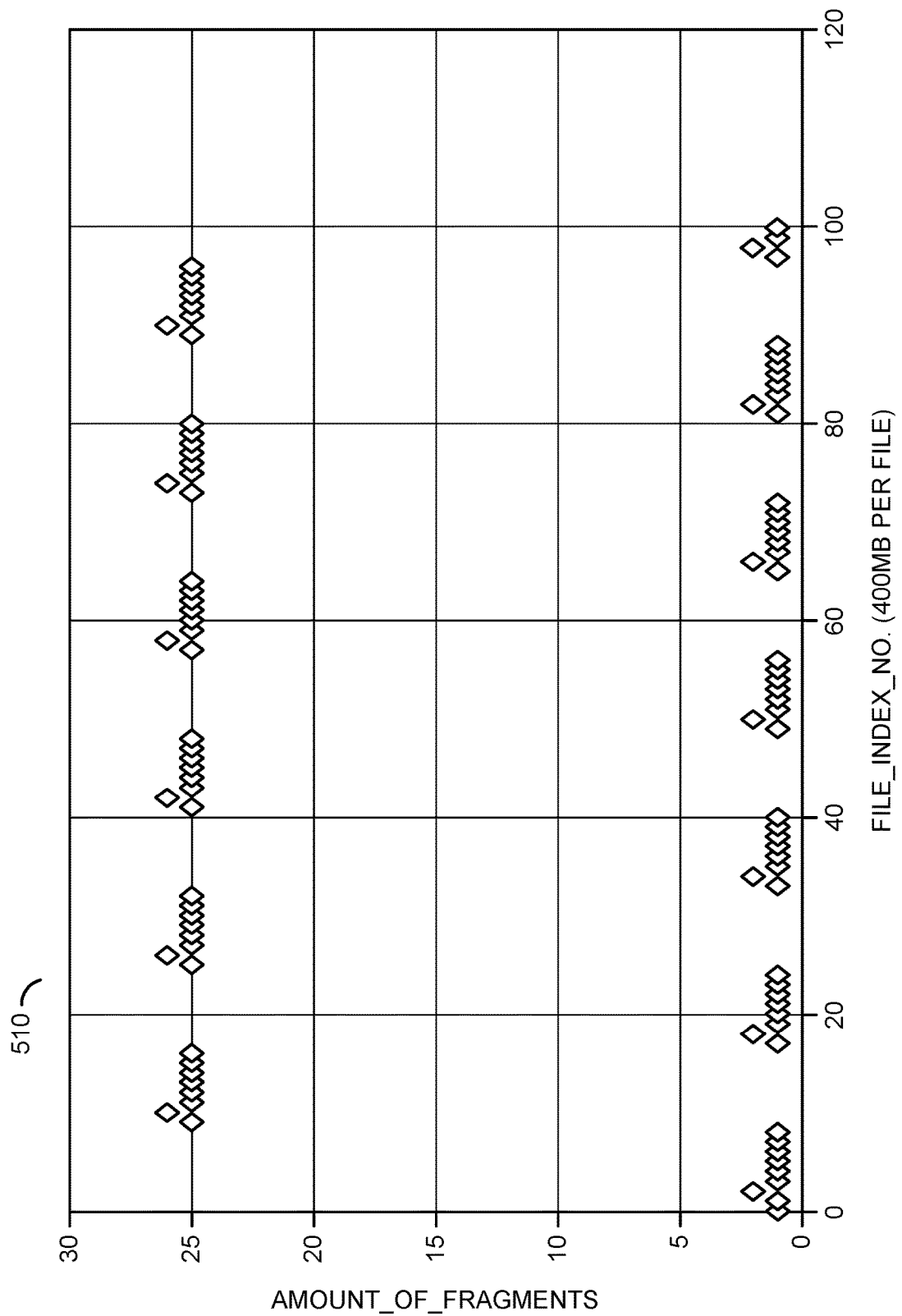
FIG. 8 is a diagram showing an enlarged view of a section 510 of FIG. 7 illustrating fragment performance for files indexed from 0 to 100 using the file management layer in accordance with an example embodiment of the invention.

Referring to FIG. 8, an enlarged view of the section 510 of FIG. 7 is shown illustrating fragment performance simulation for files indexed from 0 to 100 using the file management layer 100 in accordance with an example embodiment of the invention. For files indexed from 0 to about 120, the SD card was totally empty and no unit files existed. Every time a written file needed to be extended, a new unit file would be created (e.g., step 216 of FIG. 3) and merged to the target file (e.g., step 212 of FIG. 3). As expected, fragments of all files were controlled to under 26 (400 MB/16 MB+1=26) in this phase.

Figure 9:
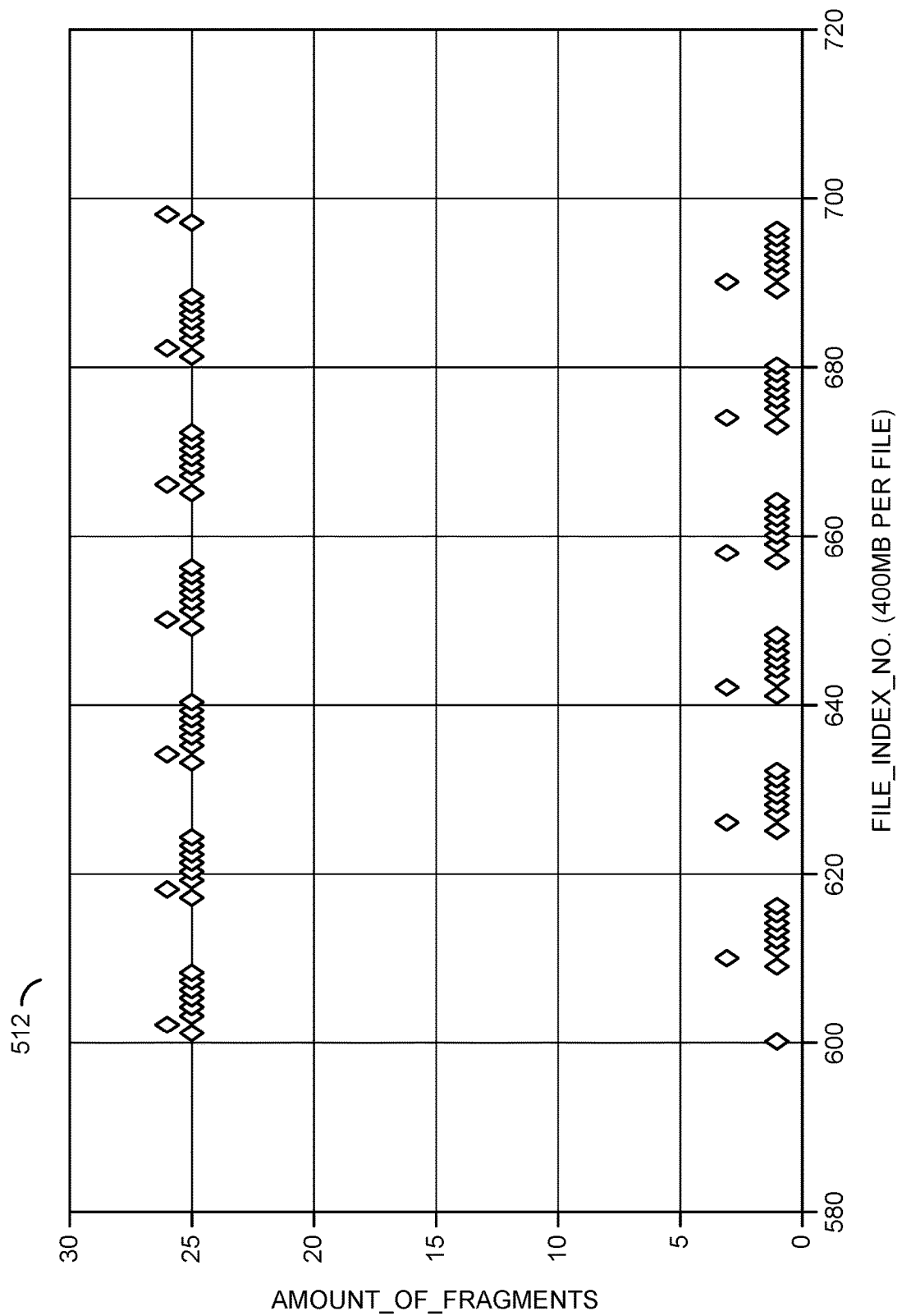
FIG. 9 is a diagram showing an enlarged view of a section 512 of FIG. 7 illustrating fragment performance for files indexed from 600 to 700 using the file management layer in accordance with an example embodiment of the invention.

Referring to FIG. 9, an enlarged view of the section 512 of FIG. 7 is shown illustrating the fragmentation performance simulation for files indexed from 600 to about 700 using the file management layer 100 in accordance with an example embodiment of the invention. For files indexed from 580 to about 720, the SD card was half full and an AMBA_DELETE action (e.g., described in connection with FIG. 4 above) had been applied to the oldest files. In an example, some unit files generated by the AMBA_DELETE operation existed in the SD card. When a target file needed to be extended, either the step 210 or the step 214 was the possible path to extend the target file, depending on if existing unit files were enough to meet requirements (e.g., the step 210 in FIG. 3). As expected, fragments of all files were controlled to under 26 (400 MB/16 MB+1=26) in this phase.

Figure 10:
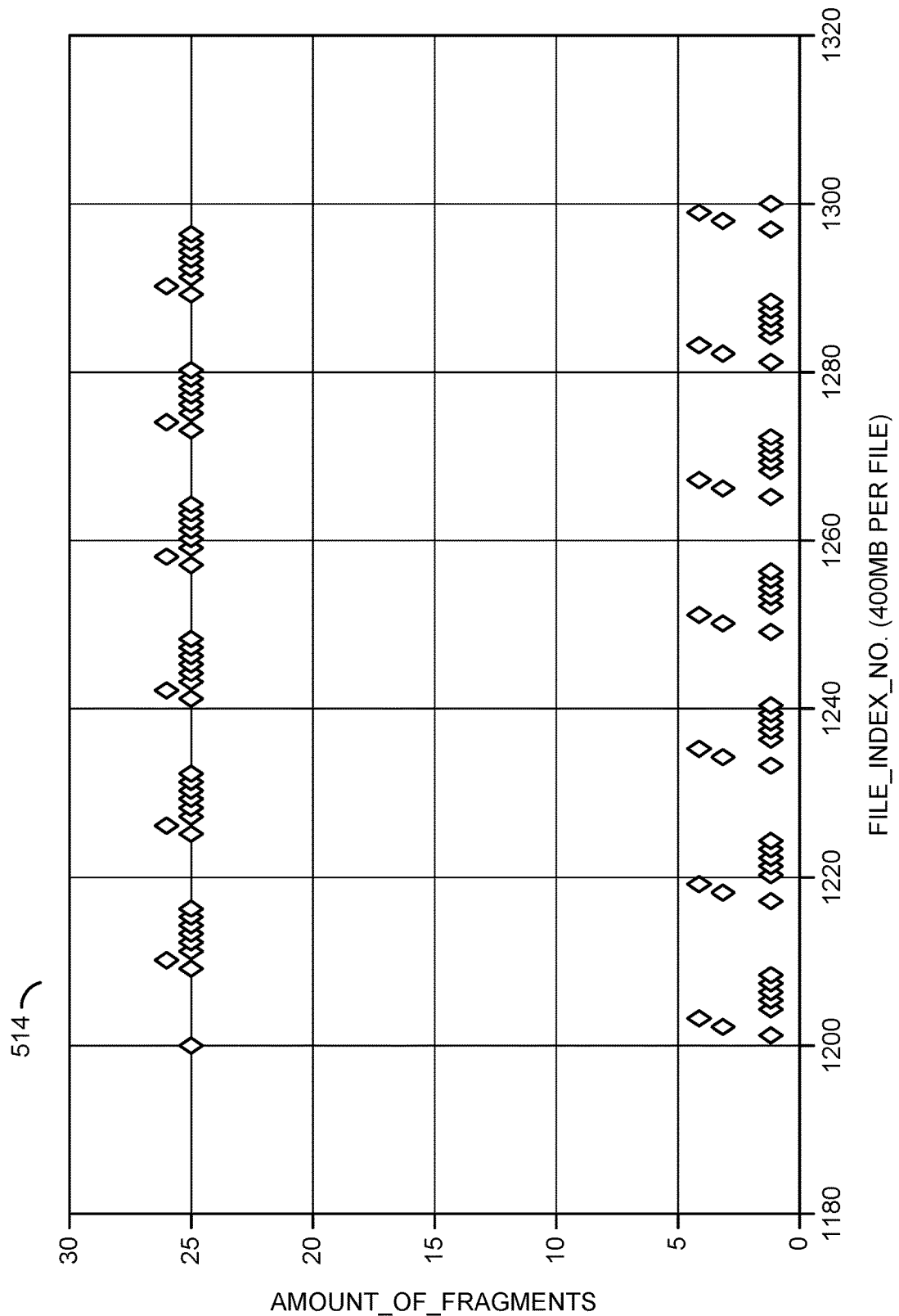
FIG. 10 is a diagram showing an enlarged view of a section 514 of FIG. 7 illustrating fragment performance for files indexed from 1200 to 1300 using the file management layer in accordance with an example embodiment of the invention.

Referring to FIG. 10, an enlarged view of the section 514 of FIG. 7 is shown illustrating fragmentation performance simulation for files indexed from 1200 to 1300 using the file management layer 100 in accordance with an example embodiment of the invention. In a final phase of the simulation, the SD card became totally full and no more space was left in the SD card to create more unit files (e.g., the step 214 in FIG. 3). When a target file needed to be extended, the only way is to call AMBA_DELETE to delete the oldest file to generate more unit files and merge the newly split unit file(s) to the target file. As expected, fragments of all files were controlled to under 26 (400 MB/16 MB+1=26).

Figure 11:
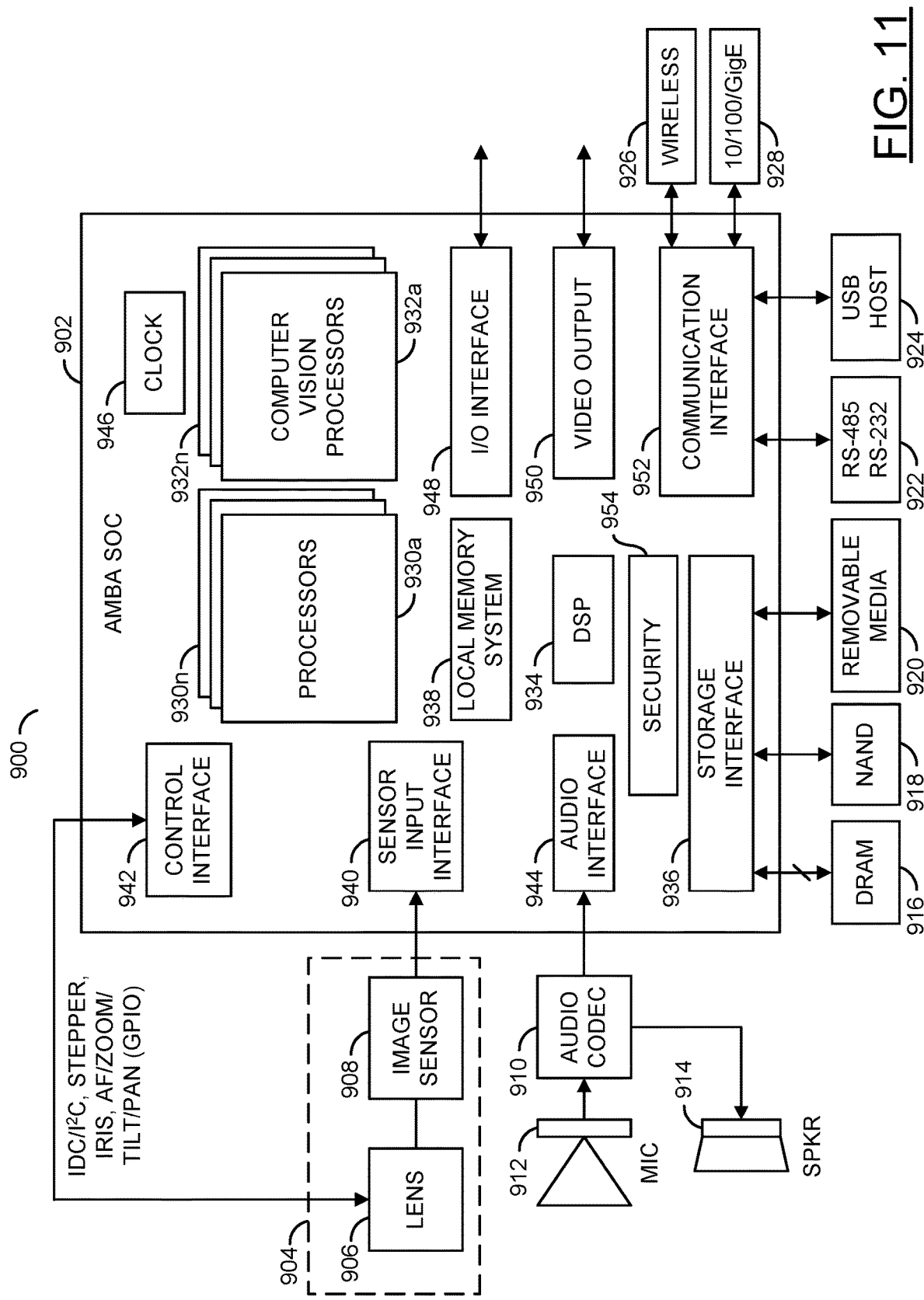
FIG. 11 is a diagram of a camera system illustrating an example implementation of a computer vision system in which a file management layer in accordance with example embodiments of the invention may be utilized.

Referring to FIG. 11, a diagram of a camera system 900 is shown illustrating an example implementation of a computer vision system in which a file management layer in accordance with example embodiments of the invention may be implemented and/or deployed. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 10.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be implemented as one or more image sensors. In one example, the circuit 908 may be implemented as an RGB sensor and/or an IR sensor. In another example, the circuit 908 may be implemented as and RGB-IR sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor(s) 908. The lens assembly 906 may implement an optical lens or lenses. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). In various embodiments, one or more of the circuit 930a-930n may implement a file management layer in accordance with embodiments of the invention. The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. The circuit 936 may implement the file management layer 100 described above in connection with FIGS. 1-8. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to, a cache (e.g., L2CACHE), a direct memory access (DMA) engine, graphic direct memory access (GDMA) engine, and fast random access memory. In an example, the DAG memory 98 may be implemented in the local memory system 938. The circuit 940 may implement a sensor input (or interface). The circuit 942 may implement one or more control interfaces including, but not limited to, an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including, but not limited to, a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module. The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE_M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone, and I/O visualization, and DRAM scrambling. In an example, the security module 958 may include a true random number generator. In an example, the security module 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE_M, NB-IoT, etc. The processor/camera circuit 902 may also include support for communication using one or more of the universal serial bus protocols (e.g., USB 1.0, 2.0, 3.0, etc.).

The functions and structures illustrated in the diagrams of FIGS. 1 to 11 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface circuit configured to receive one or more data streams;
   a removable media interface circuit configured to read and write files to a non-volatile storage medium; and
   a processor configured to generate encoded data from said one or more data streams and manage file operations involving storing the encoded data on the non-volatile storage medium, wherein
   said processor comprises a memory embodying a file management layer comprising multiple user space application program interfaces,
   said processor executes a first user space application program interface to generate a user space create command and a user space write command in response to open and write commands received from an application program, wherein the user space create command is configured to create target files that are new and open the target files that are existing, the target files comprise one or more unit files having a size based on a bitrate of said one or more data streams, and the user space write command is configured to provide information for writing the encoded data to one or more of the target files,
   said processor executes a second user space application program interface to issue a user space delete command to reclaim said one or more unit files from said target files that are no longer needed, and
   said processor executes a third user space application program interface to transform said user space create command, said user space write command, and said user space delete command into one or more system calls to a system kernel, wherein said one or more system calls perform opening, closing, reading, writing, file allocation, and file splitting operations in a physical layer of said apparatus, and said third user space application program interface is configured to create said one or more unit files and expand said target files based on said one or more unit files and the information provided by the user space write command, and
   said processor manages said file operations utilizing said file management layer to minimize at least one of a number of file fragments within said target files and an amount of unused file space within said target files.

2. The apparatus according to claim 1, wherein said non-volatile storage medium stores said encoded data utilizing at least one of a virtual file allocation table (vFAT) file system and an extended file allocation table (exFAT) file system.

3. The apparatus according to claim 1, wherein said non-volatile storage medium comprises a secure digital media (SD) card.

4. The apparatus according to claim 1, wherein said file management layer implements an application level space management scheme to create, remove, overwrite, and resize the target files utilizing said one or more unit files in order to avoid fragmentation of the target files.

5. The apparatus according to claim 4, wherein said application level space management scheme executes said first user space application program interface, said second user space application program interface, and said third user space application program interface to allocate and reclaim space in said non-volatile storage medium based on said one or more unit files.

6. The apparatus according to claim 1, wherein said processor is configured to generate said encoded data as an MPEG-4 compliant file.

7. The apparatus according to claim 1, wherein said processor is configured to encode video data as an MPEG-4 compliant video file.

8. The apparatus according to claim 1, wherein said removable media interface circuit and said processor are part of a digital recorder product.

9. The apparatus according to claim 1, wherein said removable media interface circuit and said processor are part of a digital video recorder product.

10. The apparatus according to claim 1, wherein said removable media interface circuit and said processor are part of a dash camera product.

11. The apparatus according to claim 1, wherein said removable media interface circuit and said processor are part of a digital camera system on chip (SoC) product.

12. The apparatus according to claim 1, further comprising an image sensor configured to generate video data and communicate the video data to said processor.

13. A method of managing a storage medium comprising:
   generating encoded data from one or more data streams; and
   managing file operations involving storing the encoded data on a non-volatile storage medium by executing a file management layer embodied in a memory of a processor, wherein said file management layer comprises (i) a first user space application program interface to generate a user space create command and a user space write command in response to open and write commands received from an application program, wherein the user space create command is configured to create target files that are new and open the target files that are existing, the target files comprise one or more unit files having a size based on a bitrate of said one or more data streams, and the user space write command is configured to provide information for writing the encoded data to one or more of the target files, (ii) a second user space application program interface to issue a user space delete command to reclaim said one or more unit files from said target files that are no longer needed, and (iii) a third user space application program interface to transform said user space create command, said user space write command, and said user space delete command into one or more system calls to a system kernel, wherein said one or more system calls perform opening, closing, reading, writing, file allocation, and file splitting operations in a physical layer of said storage medium, and said third user space application program interface is configured to create said one or more unit files and expand said target files based on said one or more unit files and the information provided by the user space write command, and said file operations are managed utilizing said file management layer to minimize at least one of a number of file fragments within said target files and an amount of unused file space within said target files.

14. The method according to claim 13, wherein said non-volatile storage medium stores said encoded data utilizing at least one of a virtual file allocation table (vFAT) file system and an extended file allocation table (exFAT) file system.

15. The method according to claim 13, wherein said non-volatile storage medium comprises a secure digital media (SD) card.

16. The method according to claim 13, wherein said file management layer implements an application level space management scheme to create, remove, overwrite, and resize the target files utilizing said one or more unit files in order to avoid fragmentation of the target files.

17. The method according to claim 16, wherein said application level space management scheme allocates and reclaims space in said non-volatile storage medium based on said one or more unit files.

18. The method according to claim 13, wherein said encoded data is encoded as an MPEG-4 compliant file.

19. The method according to claim 13, wherein said encoded data comprises video data and is encoded as an MPEG-4 compliant video file.

20. The method according to claim 19, further comprising:
receiving said video data from an image sensor; and
communicating said video data to said processor to generate said encoded data from said video data.

* * * * *